Patented Jan. 7, 1930

1,742,956

UNITED STATES PATENT OFFICE

GEORGE STONE GREEN, OF MARYSVILLE, KANSAS

FISHING AND TRAPPING BAIT AND METHOD OF MANUFACTURING SAME

No Drawing. Application filed March 20, 1928. Serial No. 263,214.

This invention relates to a fishing and trapping bait, and the method of manufacturing the same.

The invention has for its object to provide, in a manner as hereinafter set forth, the production of a fishing and trapping bait having as the essential element thereof blood and further including means to prevent the spoiling or deterioration of the blood, and with such means not repulsive to the fish or animals, but on the contrary attracting same.

A fishing and trapping bait in accordance with this invention comprises a composition consisting of clotted blood, salt, alum, sugar, agar, formaldehyde and water.

Animal or fowl clotted blood is employed, but preferably chicken blood.

The sugar used preferably is brown sugar.

To every one hundred pounds of clotted blood there is combined therewith a dry mixture of ten quarts of common salt, one fourth pound of powdered alum and four pounds of brown sugar.

To every gallon of blood there is employed eight tablespoonsful of agar combined with one part of formaldehyde and 100 parts of water.

The clotted blood, salt, alum and brown sugar are thoroughly mixed together, preferably by the hands and the mixture is then allowed to set for about 72 hours. At the end of such period all liquid is removed from the mixture, if any liquid has formed.

After the mixture of clotted blood, salt, alum and brown sugar has been drained in the manner as referred to, there is prepared a mixture of eight tablespoonsful of agar to every gallon of blood, the agar to be mixed with one part of formaldehyde to every 100 parts of water, only enough water to be used to dissolve the agar and the latter is dissolved preferably by the use of a double boiler. After the agar is dissolved, it is removed from the boiler and allowed to cool to the extent as not to cook the clotted blood. The mixture of agar, formaldehyde and water is then poured into cans lined with paraffine paper, and the mixture of blood, salt, alum and sugar is added, but such mixture is added before the agar mixture cools and jells.

After the agar mixture has thoroughly cooled and jelled then the can is sealed by placing a piece of paraffin paper over the top of the contents of the can and after which hot paraffin is employed to provide a thoroughly air-tight seal. After the formation of the seal the can is closed by a cover.

The method as hereinbefore set forth produces a fishing and trapping bait, having as the essential ingredient thereof clotted blood, and the latter is prevented from spoiling or deteriorating and the preservative for the latter is not repulsive to fish or animals, but on the contrary would attract them, and therefore it is thought the many advantages of a fishing and trapping bait, in accordance with this invention, can be readily understood, and although the preferred embodiment of the invention is as illustrated and described, yet it is to be understood that changes in the details of the proportions of the several ingredients can be had which will fall within the scope of the invention as claimed.

What I claim is—

1. A method of manufacturing a fishing and trapping bait consisting in thoroughly combining with a predetermined quantity of clotted blood, salt, alum and sugar, allowing the mixture to settle for a predetermined period, then draining the mixture, and then combining a predetermined quantity of the mixture with a boiled and cooled mixture of agar, formaldehyde and water.

2. As a new article of manufacture a fishing and trapping bait formed of a non-liquid mass of clotted blood, salt, alum and brown sugar combined with a non-jelled mixture of agar, formaldehyde and water.

3. As a new article of manufacture a fishing and trapping bait formed of a non-liquid mass of clotted blood, salt, alum and brown sugar combined with a non-jelled mixture of agar, formaldehyde and water, and with the proportions of one hundred pounds of clotted blood, ten quarts of salt, one quarter pound of alum, four pounds of brown sugar, eight tablespoonsful of agar to very gallon of blood, one part of formaldehyde and one hundred parts of water.

In testimony whereof, I affix my signature hereto.

GEORGE STONE GREEN.